United States Patent
Sulcer et al.

(10) Patent No.: US 6,901,435 B1
(45) Date of Patent: May 31, 2005

(54) GUI INTERPRETATION TECHNOLOGY FOR CLIENT/SERVER ENVIRONMENT

(75) Inventors: David T. Sulcer, Santa Clara, CA (US); Lawrence M. Ackner, Los Altos, CA (US); Donna S. Lowe-Cleveland, Sunnyvale, CA (US)

(73) Assignee: BMC Software, Inc., Houston, TX (US)

( * ) Notice: Subject to any disclaimer, the term of this patent is extended or adjusted under 35 U.S.C. 154(b) by 0 days.

(21) Appl. No.: 09/336,424

(22) Filed: Jun. 17, 1999

(51) Int. Cl.[7] ............................................. G06F 15/16
(52) U.S. Cl. ................ 709/219; 709/200; 709/202; 709/213; 709/224; 709/229; 705/14; 705/26; 707/3; 707/4; 713/201; 714/26; 715/507; 717/109
(58) Field of Search ........................ 709/200, 202, 709/203, 213, 224, 229, 231, 215, 219; 705/14, 26; 707/3, 4, 1, 10; 713/201; 714/26; 715/507; 717/109; 725/5; 345/733, 760, 762, 742, 731; 379/100; 955/410

(56) References Cited

U.S. PATENT DOCUMENTS

| | | | |
|---|---|---|---|
| 5,506,955 A | * 4/1996 | Chen et al. .................... 714/26 |
| 5,663,757 A | * 9/1997 | Morales .......................... 725/5 |
| 5,664,110 A | * 9/1997 | Green et al. ................... 705/26 |
| 5,675,798 A | * 10/1997 | Chang ......................... 709/224 |
| 5,742,759 A | * 4/1998 | Nessett et al. .............. 713/201 |
| 5,745,681 A | * 4/1998 | Levine et al. ............... 709/200 |
| 5,761,656 A | * 6/1998 | Ben-Shachar .................. 707/4 |
| 5,802,514 A | * 9/1998 | Huber ............................ 707/4 |
| 5,806,060 A | * 9/1998 | Borgida et al. ................. 707/3 |
| 5,897,622 A | * 4/1999 | Blinn et al. .................... 705/26 |
| 5,973,696 A | * 10/1999 | Agranat et al. ............. 345/760 |
| 6,014,634 A | * 1/2000 | Scroggie et al. .............. 705/14 |
| 6,052,710 A | * 4/2000 | Saliba et al. ................. 709/203 |
| 6,061,516 A | * 5/2000 | Yoshikawa et al. ......... 717/109 |
| 6,065,041 A | * 5/2000 | Lum et al. ................... 709/203 |
| 6,098,094 A | * 8/2000 | Barnhouse et al. ......... 709/203 |
| 6,134,592 A | * 10/2000 | Montulli ...................... 709/229 |
| 6,223,289 B1 | * 4/2001 | Wall et al. ................... 713/201 |
| 6,249,773 B1 | * 6/2001 | Allard et al. .................. 705/26 |
| 6,253,234 B1 | * 6/2001 | Hunt et al. .................. 709/213 |
| 6,253,244 B1 | * 6/2001 | Moore et al. ............... 709/231 |
| 6,286,045 B1 | * 9/2001 | Griffiths et al. ............. 709/224 |
| 6,330,007 B1 | * 12/2001 | Isreal et al. ................. 345/762 |
| 6,437,803 B1 | * 8/2002 | Panasyuk et al. ........... 345/733 |
| 6,490,601 B1 | * 12/2002 | Markus et al. .............. 715/507 |
| 6,529,936 B1 | * 3/2003 | Mayo et al. ................ 709/202 |

* cited by examiner

Primary Examiner—Jack B. Harvey
Assistant Examiner—Hai V. Nguyen
(74) Attorney, Agent, or Firm—Wong, Cabello, Lutsch, Rutherford & Brucculeri, LLP

(57) ABSTRACT

A method that involves receiving a message from a remote device, the message comprising either a definition, a state change, a command or some combination thereof; processing the definition (if any) before the state change (if any); and processing the state change (if any) before processing the command (if any).

Another method that involves recognizing a dependence on a remote device; and sending a message to the remote device, the message comprising either a definition, a state change, a command or some combination thereof.

Also apparati having a processor and a memory coupled to the processor, the memory having stored therein sequences of instructions which, when executed by the processor, cause the processor to perform the above methods.

50 Claims, 10 Drawing Sheets

| TIME | CLIENT | SERVER |
|---|---|---|
| T0 | SEND "RUNAPPLICATION" COMMAND. NO DEFINITIONS, NO STATE CHANGES. | |
| T1 | | APPLICATION LOADED AND INITIALIZED ON SERVER. SEND REPLY MESSAGE WITH NEW DEFINITIONS SUPPLIED (FORM, FIELDS). NO STATE CHANGES OR COMMANDS. |
| T2 | PROCESS NEW DEFINITIONS (CREATE THE FORM IN THE DISPLAY ACCORDING TO SPECIFICATION). | |
| T3 | PROCESS ANY STATE CHANGES (NONE). | |
| T4 | PROCESS ANY COMMANDS (NONE). | |
| T5 | WAIT FOR USER INTERACTION. | |
| T6 | USER TYPES IN "JOHN SMITH". CLIENT FLAGS NAME FIELD AS HAVING VALUE STATE CHANGE. | |
| T7 | USER PRESSES RETURN KEY. | |
| T8 | CLIENT SENDS RETURNKEYPRESSED COMMAND MESSAGE. INCLUDES ALL STATE CHANGES IN MESSAGE (IN THIS CASE, THE NAME FIELD VALUE), AND UNFLAGS ALL STATE CHANGES. | |

*FIG. 6*

| | | |
|---|---|---|
| T9 | | NEW DEFINITIONS APPLIED (NONE). |
| T10 | | STATE CHANGES APPLIED (NAME FIELD HAS VALUE "JOHN SMITH"). |
| T11 | | COMMANDS PROCESSED. IN THIS CASE, THE RETURNKEYPRESSED COMMAND CAUSES THE BUSINESS RULE TO BE FIRED. DURING THE PROCESSING, THE DATABASE LOOKUP OCCURS, AND THE SERVER'S DEPARTMENT FIELD VALUE IS CHANGED TO "ACCOUNTING". THAT FIELD IS FLAGGED AS HAVING VALUE STATE CHANGE. |
| T12 | | SEND REPLY MESSAGE. DEFINITIONS (NONE), STATE CHANGES (IN THIS CASE, THE DEPARTMENT FIELD VALUE), AND UNFLAGS ALL STATE CHANGES. |
| T13 | PROCESS NEW DEFINITIONS (NONE). | |
| T14 | PROCESS STATE CHANGES (DEPARTMENT FIELD GIVEN VALUE "ACCOUNTING"). | |
| T15 | PROCESS ANY COMMANDS (NONE). | |

*FIG. 6*
*(Continued)*

COMMANDS

| | |
|---|---|
| "LOGIN" | VALIDATE USER AND BEGIN SESSION. |
| "LOGOUT" | TERMINATE SESSION. |
| "GET TASK LIST" | REQUEST TASK LIST DEFINITIONS - I.E. ACTIVITIES THE USER CAN EXPLICITLY CHOOSE TO INITIATE FROM A CENTRAL PLACE. |
| "RUN TASK" | AN ITEM FROM THE TASK LIST HAS BEEN CHOSEN, SO OPEN THE CORRESPONDING WINDOW, CUSTOM PACKAGE, OR GUIDE. A "WINDOW" CONTAINS A FORM IN QUERY, SUBMIT, OR MODIFY MODE. AN "CUSTOM PACKAGE" CONTAINS LIST OF FORMS, START FORM, START MODE, ASSOCIATED ICON, ETC. SO OPENING IT OPENS IT'S START FORM. A "GUIDE" IS A SEQUENCE OF PROGRAMMABLE RULE ACTIONS ENCAPSULATED INTO A SINGLE COMMAND, WHICH CAN LEAD THE USER THROUGH A FORM FILL-IN ACTIVITY IN A STEP-BY-STEP PROCESS (OR ANY OTHER ACTIVITY THAT CAN BE "SCRIPTED" USING PROGRAMMABLE RULES). |
| "GET SCHEMA WINDOW" | REQUEST WINDOW DEFINITION CONTAINING A FORM. THESE WINDOWS HAVE AN ASSOCIATED MODE (QUERY, MODIFY, SUBMIT NEW), AND CAN BE ONE PANE OF A WINDOW INCLUDING A QUERY LIST WINDOW. |
| "GET MENU BY FIELD ID" | EXPAND A PROGRAMMABLE MENU WHICH IS ASSOCIATED WITH A DATA FIELD. |
| "CLOSE WINDOW" | CLOSE A WINDOW CURRENTLY OPEN. |
| "GET QUERY LIST WINDOW" | REQUEST A WINDOW DEFINITION CONTAINING A QUERY RESULT. THIS CAN BE ONE PANE OF A CONTAINING WINDOW WHICH ALSO CONTAINS A SCHEMA WINDOW. |
| "NEW DISPLAY WINDOW" | OPEN A WINDOW CONTAINING FORM IN READ-ONLY MODE. |
| "REFRESH QUERY LIST" | RUN A QUERY AGAIN SO THAT A RESULTS WINDOW CONTAINS UP-TO-DATE DATA. |
| "SUBMIT" | THE "SUBMIT" MENU OR TOOLBAR BUTTON WAS PRESSED. |
| "QUERY" | THE "QUERY" MENU OR TOOLBAR BUTTON WAS PRESSED. |
| "MODIFY" | THE "MODIFY" MENU OR TOOLBAR BUTTON WAS PRESSED. |
| "GET SCHEMA HELP" | REQUEST WINDOW DEFINITION CONTAINING HELP FOR A DB-SCHEMA. |
| "GET FIELD HELP" | REQUEST WINDOW DEFINITION CONTAINING HELP FOR A FIELD WITHIN A DB-SCHEMA. |
| "RETURN KEY" | THE RETURN KEY WAS PRESSED. |
| "MENU CHOICE" | A DATA MENU ITEM WAS SELECTED. |
| "CONTROL FIRED" | A PROGRAMMABLE MENU, TOOLBAR BUTTON, OR FORM BUTTON WAS PRESSED. |
| "SET DEFAULT" | THE "SET TO DEFAULT" MENU OR TOOLBAR BUTTON WAS PRESSED. |

FIG. 7

| | |
|---|---|
| "DISPLAY PICK LIST" | PRESENT THE USER WITH A PICKLIST (A LIST OF DATA ITEMS RETURNED BY A QUERY, MODALLY DISPLAYED) AND REQUEST THE CHOSEN VALUE BE RETURNED VIA A "SELECT PICK LIST" COMMAND. |
| "SELECT PICK LIST" | AN ITEM WAS SELECTED FROM A PICKLIST. |
| "OPEN URL" | A URL EMBEDDED IN A FORM WINDOW WAS CLICKED. CAUSED THE URL TO BE NAVIGATED TO IN THE USER'S WEB BROWSER. |
| "PROMPT USER" | THE USER IS TO BE PROMPTED TO CHOOSE BETWEEN A SET OF CHOICES. |
| "PROMPT RESPONSE" | THE USER HAS CHOSEN FROM A PROMPT. |
| "CANCEL" | A PROMPT HAS BEEN RESPONDED TO BY THE "CANCEL"CHOICE. |
| "MESSAGE BOX" | A MESSAGE IS TO BE DISPLAYED TO THE USER. |
| "LOAD ENTRY" | REQUEST A FORM WINDOW TO LOAD ENTRY BY SPECIFYING THE OFFSET INTO A QUERY RESULT LIST. |
| "LOAD ENTRY BY ID" | REQUEST A FORM WINDOW TO LOAD ENTRY BY SPECIFYING A UNIQUE ENTRY ID. |
| "OPEN ATTACHMENT" | AN ATTACHMENT HAS BEEN SELECTED FOR DISPLAY. |
| "GAIN FOCUS" | A FIELD ON A FORM HAS GAINED INPUT FOCUS. |
| "LOSE FOCUS" | A FIELD ON A FORM HAS LOST INPUT FOCUS. |
| "SWITCH MODE" | A FORM WINDOW IS CHANGING MODE, E.G. FROM QUERY TO SUBMIT. |
| "DRILL DOWN" | IN A RESULTS LIST OR TABLE FIELD, AN ENTRY HAS BEEN SELECTED FOR EXPANDED DISPLAY. |
| "REFRESH FIELD" | UPDATE THE CONTENTS OF A FIELD FROM THE DATABASE. |
| "COPY TO NEW" | THE "COPY TO NEW" MENU OR TOOLBAR BUTTON WAS PRESSED. |
| "DO NAMED SEARCH" | A PARTICULAR NAMED SEARCH HAS BEEN REQUESTED. THESE ARE STORED QUERIES THAT CAN BE EXECUTED ON COMMAND. |
| "KEEP ALIVE SESSION" | RESET THE SESSION TIMEOUT. THIS ENABLES THE SERVER TO CLEAN UP INACTIVE SESSIONS. |
| "CLOSE CONFIRMATION" | PROMPT THE USER TO CONFIRM CLOSE OF AN UNCOMMITTED WINDOW. |
| "SELECT CLOSE CONFIRMATION" | THE USER RESPONSE TO A CLOSECONFIRMATION REQUEST. |

*FIG. 7*
*(Continued)*

| STATES | | |
|---|---|---|
| "SESSION - WINDOWLIST" | LIST OF ALL WINDOWS, WHETHER THEY ARE CURRENTLY OPEN, CLOSED. | |
| "WINDOW - FOCUSFIELD" | FIELD WHICH CURRENTLY HAS INPUT FOCUS FOR THAT WINDOW. | |
| "WINDOW - ENTRIES" | THE RESULT OF A QUERY IN A RESULT LIST WINDOW (ROWS OF DATA). | |
| "WINDOW - SELECTEDENTRIES" | IN A RESULT LIST OR TABLE FIELD, THE CURRENTLY SELECTED ENTRIES. | |
| "WINDOW - GUIDEWAIT" | WHETHER OR NOT THE USER IS CURRENTLY PROMPTED IN THE CONTEXT OF A GUIDE. | |
| "WINDOW - PROMPTTEXTLIST" | THE CURRENT CONTENTS OF THE PROMPT PANE WHILE RUNNING A GUIDE. | |
| "WINDOW - CHANGEFLAG" | WHETHER OR NOT THE WINDOW IS CURRENTLY MARKED AS MODIFIED. | |
| "WINDOW - PROMPTWINDOWSTATE" | WHETHER OR NOT THE PROMPT PANE IS VISIBLE. THE PROMPT PANE IS AN OPTIONAL PART OF A SCHEMA WINDOW WHICH CAN DISPLAY MESSAGES MODELESSLY, AND IS FREQUENTLY USED BY FORM-FILL-IN GUIDES. | |
| "FIELD - VALUE" | THE CURRENT VALUE OF A FIELD (CAN BE DIFFERENT TYPES). | |
| "FIELD - DISPLAY - VISIBLE" | VISIBLE VS. HIDDEN FOR A FIELD. | |
| "FIELD - DISPLAY - ACCESS" | READ-WRITE VS. READ-ONLY VS. DISABLED FOR A FIELD. | |
| "FIELD - DISPLAY - "MENUNAME" | THE CURRENT DATA MENU ASSOCIATED WITH A FIELD. | |
| "FIELD - DISPLAY - LABELCOLOR" | THE CURRENT COLOR OF THE LABEL ASSOCIATED WITH A FIELD. | |
| "FIELD - STATHISTVALUE" | THE CURRENT CONTENTS OF A SPECIAL VALUE TYPE. THIS IS THE AUDIT TRAIL OF CHANGES TO AN ENUM "STATUS" FIELD, ENCODED INTO A SPECIAL FORMAT. | |
| "FIELD - DIARYVALUE" | THE CURRENT CONTENTS OF A SPECIAL VALUE TYPE. THIS IS AN APPEND-ONLY CHARACTER FIELD WHICH ALWAYS ADDS USER/TIMESTAMP WHENEVER AN APPEND OCCURS. THE PREVIOUS ENTRIES ARE READ-ONLY. | |
| "FIELD - TABLEFIELDVALUE" | THE CURRENT CONTENTS OF A SPECIAL VALUE TYPE. THIS IS AN EMBEDDED QUERY RESULT LIST WHICH CONTAINS A LIST OF ENTRY DATA WHICH CAN CHANGE BY A "REFRESH FIELD" COMMAND. | |
| "FIELD - ATTACHFIELDVALUE" | THE CURRENT CONTENTS OF A SPECIAL VALUE TYPE. THIS IS A REFERENCE TO, AND ATTRIBUTES OF, A FILE STORED ON THE SERVER WHICH CAN BE DOWNLOADED FOR DISPLAY BY THE OPERATING SYSTEM (OR BROWSER). | |
| "FIELD - TABLEROWSELECTION" | WHICH ROWS OF A TABLE FIELD ARE CURRENTLY SELECTED. THIS REFERS TO THE USER'S ABILITY TO DO MULTIPLE SELECTION OPERATIONS ON A TABLE FIELD, AND THE ABILITY OF PROGRAMMABLE RULES TO BE AFFECTED BY SUCH SELECTION. | |

*FIG. 8*

DEFINITIONS

| | |
|---|---|
| "SESSION ID" | UNIQUE SESSION IDENTIFICATION STRUCTURE |
| "TASK LIST" | LIST OF AVAILABLE FORMS, GUIDES, CUSTOM PACKAGES. |
| "FIELD DEFINITIONS" | FIELD TYPE, LAYOUT, VALIDATION RANGE, DISPLAY PROPERTIES, ETC. ALL THE INFORMATION TO CREATE A TYPED DATA FIELD ON A FORM. CAN INCLUDE DATA FIELDS OF TYPE CHARACTER, DIARY, INTEGER, REAL/DECIMAL, ENUM SELECTION, DATE/TIME, ATTACHMENT, AND ALSO STATIC TRIM ELEMENTS SUCH AS LINES, BOXES, TEXT LABELS, TAB CONTROLS, AND DATA TABLE FIELD (A QUERY RESULT LIST EMBEDDED WITHIN A FORM). |
| "MENU DEFINITIONS" | HIERARCHICAL DATA MENU DESCRIPTION WHICH CAN BE ATTACHED TO A FIELD. LABELS FOR ITEMS, VALUE FOR ITEMS, NESTED SUBMENUS. |
| "RESULTS LIST DEFINITIONS" | QUERY RESULTS WINDOW DESCRIPTION (E.G. COLUMN TITLES). |
| "FIELD HELP" | THE HELP TEXT PROVIDED FOR FIELD BY THE CUSTOM PACKAGE AUTHOR. |
| "NEW ENTRY ID" | THE ID OF A NEW ENTRY (FOR IMPLEMENTATIONS IN WHICH EACH ENTRY HAS EXACTLY ONE WINDOW). |
| "SCHEMA HELP" | THE HELP TEXT PROVIDED FOR A FORM. |
| "TASK CUSTOM PACKAGE" | DESCRIPTION OF CUSTOM PACKAGE ENTRY POINT. |

*FIG. 9*

GUI INTERPRETATION TECHNOLOGY FOR CLIENT/SERVER ENVIRONMENT

FIELD OF INVENTION

The field of invention relates to client/server processing and more specifically to the efficient implementation of complex programming environments within a client/server environment.

BACKGROUND OF THE INVENTION

Client/server architecture involves a lower performance and less expensive client device (typically) located on an employee's desktop, such as a personal computer (PC), communicatively coupled through a local area network (LAN), corporate intranet, the Internet or other network to a higher performance and more expensive server device, such as a workstation or mainframe.

The benefit of the client/server architecture is overall reduced cost per MIPS due to the implementation of the inexpensive desktop devices. Generally, sophisticated tasks are left to the server while more mundane tasks are left to the client resulting in better cost performance as compared to other architectures (such as purely terminal based environments).

As such, application programs running over the client/server architecture involve cooperative software located on both the client and the server. Two approaches have generally been taken to divide the functional responsibility between the server software and the client software: the traditional client server approach 101, shown in FIG. 1a, and the display oriented approach 102, shown in FIG. 1b.

The traditional approach 101 involves client software 103 executed on the client 107a that translates between GUI interactivity 104a with the client's graphical user interface (GUI) 105a and function calls/responses 106 issued to/from the server software 108a. In this approach, the client software 103 manages significant application logic while leaving sophisticated or necessarily centralized functionality for the server software 108a.

The display oriented approach 102, sends all GUI interactivity 104b over the network. As such the client software is practically non existent since the GUI itself 105b represents the most substantial logic existing on the client 107b.

Many application software types are programmable. Programmable application software is used to create custom software routines (e.g., a custom automated inventory workflow for a specific company). Typically, the custom software routines conform to a programmable environment. A programmable environment is essentially a set of global programming rules capable of supporting different custom software routines.

Unfortunately, both of the aforementioned approaches 101, 102 do not handle programmable environments well. As for the traditional approach 101, the main problems derive from the client software's 103 attempt to support the full range of behavior allowed by a comprehensive programmable environment. A first issue concerns efficiency. That is, the client software 103 must be able to successfully handle all types of user activity even if many forms are simply never utilized. For example, if a specific programmable application happens to use only ten programmable operations out of a possible 300, its associated client software 103 must contain logic to handle all 300 possible actions.

A second issue concerns the client software's 103 "awareness". For example, consider an instance where a programmable environment rule mandates initiation of a data entry form when both a certain button is clicked and a certain field has the value "X". The client software 103 intelligence should recognize whether the field has the value "X" when the button is clicked before sending a "data entry form" request to the server software 108a. As such, the client software 103 must have sufficient awareness as to the applicable programming rules.

Another problem involves download time. When the application is commenced, the large and complicated blocks of client software 103 consume too much time when downloaded from the server. Thus, in the traditional approach 101, large and complex client software 103 frequently presents too much offered load to the client device during application operation and to the network during application initiation. Furthermore, pre-installation of large client software 103 modules on the client machine 107a increase the cost of maintaining such installations and the pre-installation requirements can render the applications unusable in environments such as the World Wide Web.

The display oriented approach 102 of FIG. 1b fairly addresses the above problems. Essentially, most of the logic associated with the client software 103 of the traditional approach 101 is transferred to the server software 108b. Since the remaining client software is negligible there is little offered load to the client device 107b.

However, under the display oriented approach 102, the application typically assumes some standard display mechanism exists. The server software 108b is therefore locked into a single set of display characteristics and capabilities. For example HTML takes away a significant amount of programmer control over display since the layout is done using the constraint based mechanisms of HTML. This constraint is prohibitive in programmable environments which typically require an ability to create various display features.

Thus, for programmable environments, the traditional approach 101 comprises too much client software 103 while the display approach limits 102 the application (or at least the server software 108b) to a single set of display mechanisms.

What is needed is a new approach suitable for programmable environments.

SUMMARY OF THE INVENTION

A method comprising receiving a message from a remote device, the message comprising either a definition, a state change, a command or some combination thereof; processing the definition (if any) before the state change (if any); and processing the state change (if any) before processing the command (if any).

Another method comprising recognizing a dependence on a remote device; and sending a message to the remote device, the message comprising either a definition, a state change, a command or some combination thereof.

Also apparati are described having a processor and a memory coupled to the processor, the memory having stored therein sequences of instructions which, when executed by the processor, cause the processor to perform the above methods.

BRIEF DESCRIPTION OF THE DRAWINGS

The present invention is illustrated by way of example and not limitation in the figures of the accompanying drawings, in which like references indicate similar elements, and in which:

FIG. 6 shows the execution of the application of FIG. 5.

FIG. 7 is a list of commands for an application that uses the protocol.

FIG. 8 is a list of states that for an application that uses the protocol.

FIG. 9 is a list of definitions for an application that uses the protocol.

DETAILED DESCRIPTION

A method is described that involves receiving a message from a remote device, the message comprising either a definition, a state change, a command or some combination thereof; processing the definition (if any) before the state change (if any); and processing the state change (if any) before processing the command (if any).

Another method is described that involves recognizing a dependence on a remote device; and sending a message to the remote device, the message comprising either a definition, a state change, a command or some combination thereof.

Also apparati are described having a processor and a memory coupled to the processor, the memory having stored therein sequences of instructions which, when executed by the processor, cause the processor to perform the above methods.

These and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than restrictive sense and the invention measured only in terms of the claims.

Figure 1A:
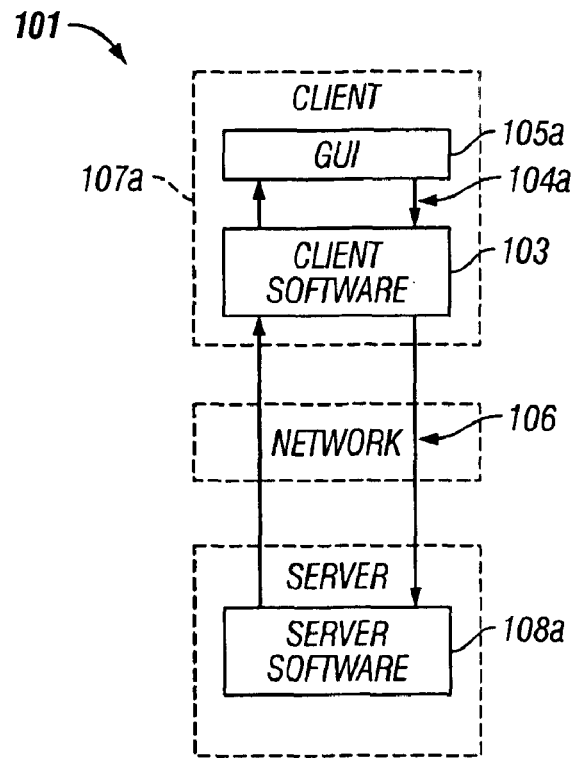
FIG. 1a shows a traditional client/server approach.
Figure 1B:
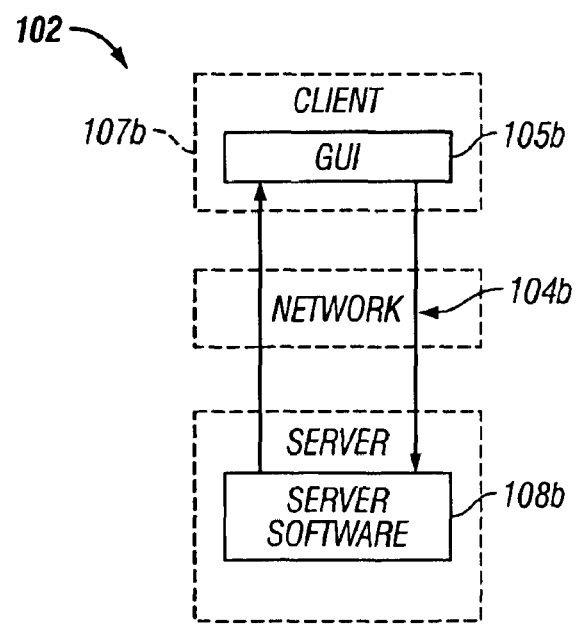
FIG. 1b shows a display oriented client/server approach.
Figure 2:
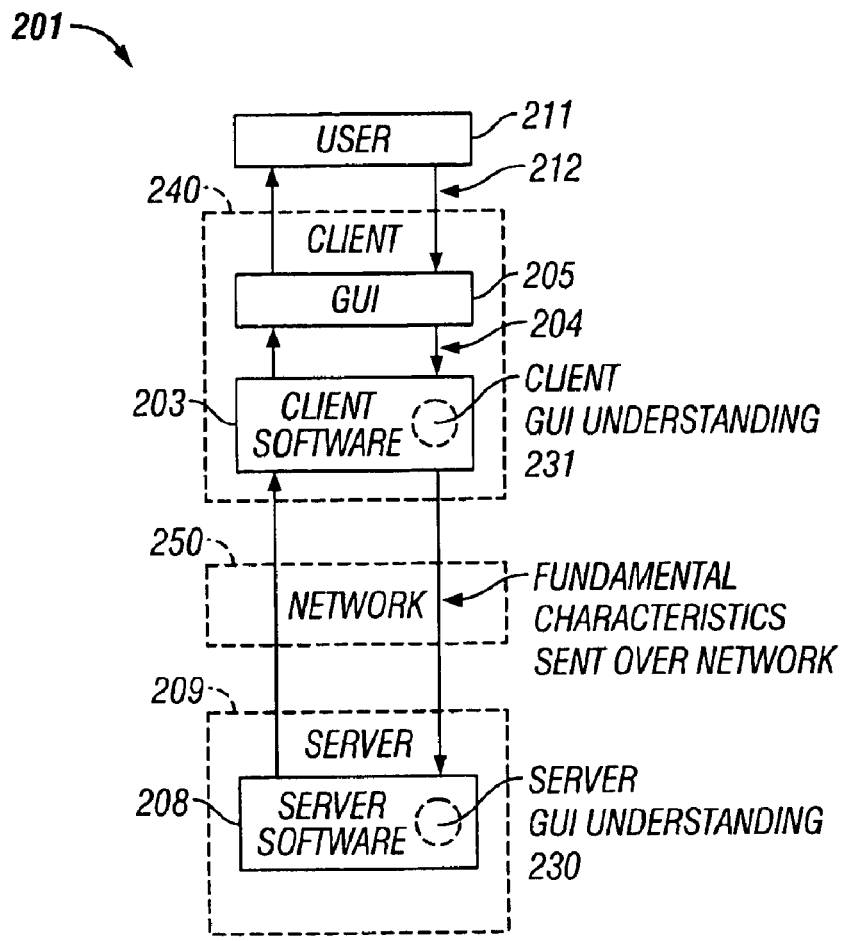
FIG. 2 shows a client/server architecture.

A client/server architecture 201 suitable for programmable applications, among others, is shown in FIG. 2. This architecture 201 may be viewed as an intermediate approach when compared to the traditional 101 and display oriented 102 approaches shown back in FIG. 1. That is, the client software 203 is small enough such that client device 240 or network 250 performance is not a concern while the architecture 201 allows for versatile display characteristics. Again, the application software is the combination of the client software 203 and the server software 208. Hereafter, for simplicity, the term application may be used to refer to a programmable application, however, it should be understood that that the present invention may be applied to non-programmable applications as well.

GUI interactivity 204 refers to the traffic between the GUI 205 and the client software 203. The GUI 205 is a translation layer between the user 211 and the application software. Thus GUI interactivity 204 is a translated form of the interactivity 212 between the user 211 and the GUI 205. Use of the term "interactivity" is meant to indicate the traffic flow is bidirectional. That is, the GUI's 205 primary purpose is to allow the user 211 to communicate with the application as well as allow the application to communicate with the user 211.

The architecture 201 is based upon the reduction of GUI interactivity 204 (and thus ultimately user/GUI interactivity 212) by the client software 203 and server software 208 to three fundamental characteristics (definitions, state changes and commands as discussed later) and the effective hierarchical or ordered exchange 210 of these characteristics between the client software 203 and the server software 208.

The reduction of user activity (i.e., traffic flow from the user 211 to the application) to these fundamental characteristics by the client software 203 coupled with communicating them to the server software 208 and then processing them via an ordered sequence within the server software 208 allows the server software 208 to efficiently maintain and monitor, within the server device 209 itself, a sufficient understanding of the GUI 205 at all times.

Thus, the three fundamental characteristics and their associated hierarchical processing by the server software 208 are used by the server software 208 to build an understanding of the GUI 230 that correctly interprets relevant user activity at the GUI 205 and subsequently processes the application according to this activity. For example, if the user 211 interconnects two icons with a line to form a workflow in the GUI's 205 programmable environment, the server software 208 properly detects this activity and builds the corresponding workflow into the application.

In this example, although the fundamental characteristics do not necessarily need to be sent over the network 250 in an ordered fashion they must be processed by the server software 208 in an ordered fashion. Thus many embodiments may, for simplicity, choose to similarly package the fundamental characteristics for transport over the network 250 in an ordered fashion. Regardless, it may be said for any embodiment that the fundamental characteristics are effectively exchanged in an ordered fashion since they are processed at the receiving end according to the hierarchy.

Application activity toward the user 211 (i.e., traffic flow from the server software 208 to the user 211) may be communicated from the server software 208 to the client software 203 using the same three fundamental characteristics coupled with the same ordered processing by the client software 203. For example, assume some particular user activity mandates the application respond to the user 211 with a data entry form. When the server software 208 detects this particular activity (from its GUI understanding 230), it sends the data entry form (reduced to the fundamental characteristics) to the client software 203.

The client software 203, similar to the server software 208, also maintains a sufficient description of the GUI 205 at all times. When the client software 203 receives the entry form related characteristics, it updates its GUI understanding 231 by processing these characteristics in their proper order. This understanding 231 is then translated into an appropriate GUI 205 format, sent to the GUI 205 and the data entry form is then displayed in the GUI 205.

Although the above examples may be read to imply that all of the fundamental characteristic types (definition, state change and command) are always transferred between the client software 203 and the server software 208 for a particular activity, it is important to note that this is not necessarily true in all instances. That is, as discussed later, in some cases only one or two of the fundamental characteristics are involved, and therefore only these are transferred between the client 203 and the server 208 software.

As both the client software 203 and the server software 208 each maintain a GUI understanding 231, 230 and as each updates the other as to changes observed in their understanding 231, 230 it may be said that the client software 203 and the server software 208 are "synchronized" with one another as to their GUI understandings 231, 230. This is discussed in more detail below.

The GUI understandings 230,231 are used to track or affect status of the GUI 205 on the client. Since the actual matter appearing within the GUI 205 must be in accordance with the programmable environment presented to the user, the rules or other features associated with the programmable environment may also be included in the GUI understanding 230,231. As such, use of the term "GUI" or "GUI environment" or "GUI understanding" are meant to include, where applicable, these environmental aspects as well.

The GUI understandings 230,231 are implemented as records of the definitions and states that apply to the presentation of the user's application as well as any applicable commands. Records may be any data structure such as objects, variables or files. As discussed in more detail ahead, definitions are aspects of the application that do not change during the execution of the application while states are aspects of the application that may change during the execution of the application. A state change is therefore any change to an aspect of the application designed to be modifiable during application execution.

The protocol described herein is ordered or hierarchical. This means fundamental characteristics, after being transferred between client 240 and server 209, are processed at the receiving device in a particular order. Specifically, for any GUT interactivity 204 (whether initiated by the user 211 or the application): 1) definitions (if any) are processed before state changes (if any); and 2) state changes (if any) are processed before commands (if any). With respect to definitions and state changes, the term processed refers to the activity of updating the GUI understanding at the receiving device. With respect to commands, the term processed refers to executing the directive associated with the command or updating the GUI understanding at the receiving device All of these features are discussed in more detail ahead. A detailed discussion of the fundamental characteristics immediately follows, followed by a detailed discussion of the hierarchical protocol.

The first of the three fundamental characteristics is a definition. A definition is any fixed aspect of the GUI 205 environment associated with the application. Use of the term "fixed" means definitions do not change during application execution. An example is an application specific data entry form having fixed categories.

For example, consider an "inventory" data entry form (also referred to as simply a data form) having two columns: "part number" and "quantity". During execution of the application, in this example, the "inventory" data entry form always uses "part number" and "quantity" columns. Thus, these aspects are fixed. As such a definition may exist for these aspects of the entry form. The structure of the definition may resemble a specification that lists the fixed aspects such as the name ("inventory") each column ("part number" and "quantity"), the visual dimensions of each column if they are fixed (e.g., pixel dimensions), the colors used to construct the features of the form if they are fixed, etc.

It is important to note that definitions may be tailored to the level of fixed detail the software designer chooses. That is, one design may choose a fixed coloring scheme for the data entry field while another application may allow the application or user to vary the coloring scheme. In the former application the color is a definition, while in the later it is a state (since it may be varied).

Furthermore, definition types may be as varied as the GUI presentation or a programmable environment supports. For example, if the environment supports various forms, programmable rules, colors, line-drawing etc., any fixed aspect (s) of these may be organized within separate definitions for each. For example, if a particular form has a fixed size it will be reflected in the form's definition. Also, if the form has a fixed shape it will be reflected in the form's definition. Thus, to summarize, definitions are structures that enumerate or otherwise organize the fixed characteristics associated with any feature or aspect of the programmable environment.

Furthermore, definitions of the GUI 205 environment may also include purely environmental fixed features such as settings or functions that always apply to the application's programming environment. For example, a list of those programmable rules that always apply (or do not apply). Thus definitions are not limited to strictly graphical features.

As the GUI 205 presents the application to the user 211, the definitions are used to identify and describe the fixed building blocks of that presentation. Remember that the present invention reduces GUI interactivity 204 to three fundamental characteristics. The definition characteristic may be viewed as a reduction of the fixed matter or "things" (such as forms or environmental settings) created or established within the application by the user 211 or application software.

The definition approach is well suited to object-oriented technologies since these technologies easily create various classes of objects. For example, form objects can be further classified as warehouse form objects or factory form objects. Still more objects may be defined in future applications as well. Thus the approach described here helps avoid the graphical limitations associated with the display oriented approach referred to in FIG. 1b. Whereas the display oriented approach 102 has a fixed, predetermined set of display characteristics and capabilities; the scope of the display characteristics described according to the present invention may be coextensive with the relatively unlimited scope of object oriented technology itself.

Continuing with the "inventory" data form as an example, a brief discussion of the communication between client software 203 and server software 208 follows next. Assume the user points and clicks on a icon to initially open the inventory data entry form. The applicable fundamental characteristics that reflect the point and click on the icon are sent from client software 203 to the server 208. The server software 208 updates its GUI understanding 230 and immediately recognizes the user's desire for the inventory data entry form. The server software 208 may then: 1) pull the definition of the inventory form (e.g., the "part number" and "quantity" column information and any other fixed feature such as windows size or color the software is designed for) from a database; 2) update its GUI understanding 230 with the definition of the form; and 3) send the same definition of the form to the client software 203. The client software likewise updates its GUI understanding 231 with the new definition and instructs the GUI 205 to display the form.

It may be helpful to assume part of the form's definition is to have initial default values of "blank" for all part number and quantity values. Thus along with both GUI understandings 230,231 having a new inventory form definition, they also have a new state of "blank" for each part number and quantity field in the form. State is discussed in more detail ahead. Note, however, that in this example the entire definition is transferred between the server 209 and client 240. This is one characteristic of the protocol described herein.

Remember that the architecture 201 is based upon the reduction of application related GUI interactivity 204 to three fundamental characteristics: definitions, state changes and commands. The first fundamental characteristic, definitions, has just been described. A description of the second fundamental characteristic, states changes, is described next.

Before discussing state change, however, the concept of "state" will be described. State is the matter associated with the GUI 205 or programmable environment that is not fixed; that is—the application allows for its modification during execution.

A good example continues with the aforementioned "inventory" data entry form. As discussed, the form has fixed definition matter as represented by its name, "part number" and "quantity" columns. As the form is filled out, however, actual values may be inserted within the respective columns (e.g., "16F1802" in the part number column and "4–5 k" in the quantity column). Additional values may be added while existing others may be replaced with new values. These are all modifiable during program execution and therefore reflect state. Thus, in this example, the inventory data entry form has associated definitions as well as associated states.

Just as various definition types exists, various state types exists as well. That is, for example, states relating to other forms, drawn lines, environmental rules, etc. may also exist. These states may be organized into records according to their corresponding forms, drawn lines, rules, etc. as well.

A state change is a change in any state associated with the GUI 205 environment. For example, in reference to the previous example, changing the quantity of part number 16F1802 from "4–5 k" to "7 k" represents a change in state for that entry of the quantity column of the inventory form.

If this change is made by the user, the client software 203 updates its GUI understanding 231 accordingly (e.g., by writing the new quantity into the quantity state associated with the inventory data form). The client software 203 flags the state change as being associated with the next outgoing message to the server 209. Thus, when the next message is ultimately sent to the server 209, this same state change is sent to the server software 208 (which then similarly updates its GUI understanding 230). As discussed ahead, the sending of the message is triggered by a command. Note that both GUI understandings 230,231 have a record of the GUI 205 state but only transfer the change to that state. This is another characteristic of the protocol herein described.

The state change information associated with a message typically comprises an identification of the affected state (e.g., a quantity entry in data form named "inventory") and the updated parameter (e.g., the new quantity) thereby reflecting the corresponding state change. State changes may relate to one or more definitions depending on the relationship between the state change and definitions involved (e.g., the new quantity entry relates to the quantity column definition).

Similarly, a state change may be initiated by the application. Continuing with the previous example, assume the application dictates that a corresponding market price (provided by the application) must be displayed in a separate "price" column whenever the quantity exceeds 6 k. When the server software 208 updates its GUI understanding 230 and recognizes that a quantity above 6 k has been entered in the quantity field by the user 211, the server software 208 looks up the current market price in a database and presents it, along with information for a new "price" column, as state changes to the inventory data form within its GUI understanding 230. Thus both a new "price" column and the price for the part number are state changes in this example.

These state changes are then sent to the client software 203 which updates its GUI understanding 231 and then presents the GUI 205 with the corresponding instruction(s). The GUI 205 then presents the user with the new column and price in the inventory form. Again notice that both GUI understandings 230,231 comprise state records yet only communicate to one another with state changes as opposed to the entire state record. Thus, according to the protocol described herein, whereas entire definitions are transferred between server and client only state changes (and not the entire state) are transferred.

Furthermore, as state information may comprise the position of a movable image within the GUI 205, the GUI understandings 230, 231 may be updated whenever an image is moved within the GUI 205. As such, the server software 208 may detect whether images are overlapping, next to each other, etc. which may (or may not) invoke further application software processes. The point is, however, any application programming environment may be supported/defined since the server's GUI understanding 230 offers tremendous versatility. Some application programming environments may trigger further processing if images overlap while other environments may not.

Thus, to compare definitions and state changes: definitions are reductions of the fixed "things" within the application's presentation to the user (such as fixed images and environmental parameters), whereas state changes are reductions of changes to modifiable "things" within that same environment. The last fundamental characteristic, commands, may now be discussed.

It may be helpful to recall the background discussion. Remember that the client server approach is founded on the concept that an application program is realized in the form of software that runs on both the client 240 and the server 209. Thus, in order for the application to operate properly, the client 240 and server 209 must cooperatively work together.

This cooperation may also be viewed as a form of co-dependence. That is, the client software 203 depends upon the server software 208 for certain application functionality (e.g., higher performance computations than the client 240 is cost effectively able to perform) while the server software 208 similarly depends upon the client software 203 for certain application functionality (e.g., assisting in the presentation of GUI 205 matter to the user 211).

Commands are signatures of this co-dependence. Specifically, commands are directives that directly or indirectly cause the remote software to undertake some action or function. When the GUI understanding of a local (i.e., sending) device produces a situation where the relevance of that GUI understanding to the proper operation of the application requires the involvement of the remote (i.e., receiving) device, a message is sent from the local device to the remote device that enables the remote device to update its GUI understanding and perform the needed functionality accordingly.

For example consider an example where, according to the programmable environment, certain user 211 activity (e.g., placing two GUI 205 images next to each other) mandates the application respond to the user 211 (e.g., with "Form A" on the GUI 205). Thus the user 211 implicitly tells the application to produce "Form A" by placing these two images next to each other. In this example, assume the server software 208 recognizes the user 211 activity (e.g., the placing of the two images next to each other) on its GUI understanding 230 and subsequently performs the appropriate response (e.g., produces "Form A") and relays it to the client software 203.

In this example, the client software 203 recognizes the user 211 activity requires the assistance of the server software 208 and accordingly flags the state change (i.e., new positions of the images within its GUI understanding 231) and sends a message to the server that incorporates the state change as well as a command. Thus, the client 203 is designed to recognize when it depends upon the server software 208 in order for the application to properly perform as a whole. The command in this example takes the form of an instruction (e.g., "Get Form") and may be referred to as a command instruction. Another type of command, referred to as an express command, is discussed after the current example is described.

The specificity of the command instruction is up to the designer. For example, the command instruction may be "Get Form" (general) or "Get Form A" (specific). In the first instance the server software 208 must have the intelligence to recognize which form to get by observing its GUI understanding 230 while in the second instance the server software is simply told which form to get and updates its GUI understanding 230 mostly to synchronize with the client software 203 in order to support (perhaps) subsequent processes that depend upon the server software 207 having the updated GUI understanding. Thus the degree of intelligence placed at either device 240, 209 is up to the designer.

Continuing with the primary example, the server software 208 retrieves "Form A" and updates its GUI understanding 230 with the "Form A" definition and applicable state change (if any). Since the user 211 is not seated at the server 208 but instead is located in a remote location with the client 240, in order for the application to work properly, the server software 208 depends upon the client software 203 to actually present "Form A" to the user 211 on his/her GUI 205. Thus another message is sent, this time from the server software 208 to the client software 203 that incorporates the applicable "Form A" related definitions and/or state changes and a command such as "Display Form". The application in this instance implicitly tells the user to read "Form A".

Thus a command is a directive between the server software 208 and client software 240 that directly or indirectly causes the remote software to perform some function such as (on the server side) reading a database, performing logic or other calculations, communicating with another device, etc. This directive is also related to the co-dependence of the remote software 203, 208 with one another.

The previous example involved an instruction-like command, such as "Get Form". As mentioned previously, commands may also be express. In many cases commands are expressly offered at the GUI 205/user 211 interface. Examples include mouse button clicks, hitting the enter key, or clicking on a save button in a tool bar. Since mouse buttons, the enter key and the save button are all visible options presented to the user they are referred to as express commands.

With express commands, more intelligence is typically applied to the server software 208. That is, similar to the previous "Get Form" (general) example, the server software 208 is responsible for determining the proper application response by observing the update to its GUI understanding 230. Nevertheless, the client software 203 is still responsible for recognizing the dependence on the server software 208. The client software flags appropriate user 211 activity, updates this activity into its GUI understanding 231 and relays to the server software 208 a message having the new activity as well as the express command (e.g., "enter key hit" or "mouse button clicked").

Recognizing the dependence upon remote software does not necessarily require a high degree of local cognition or intelligence. It simply means the local software is designed to construct a message when proper operation of the application necessitates the assistance of the remote software. For example, in one embodiment, all application functions triggered by the user's 211 hitting of a return key are executed on the server software 208. In this embodiment, in order to embed appropriate recognition on the client software 203, the client software 203 is designed to construct a message whenever the user hits the return key.

Although commands may be related to a state change in the sense that, for example, hitting the enter key (i.e., an express command) causes a special process to start after a data entry field is updated with a new value (i.e., a state change); commands do not require explicit reference to a state or a state change. That is, using this example, the server software 208 may recognize from its own logic and corresponding GUI understanding 230 that the new data entry field value (the state change) in conjunction with hitting the enter key (the command) is supposed to start the special process. This is also a good example of a situation where a message has state change and command information but no definition information.

Thus, in this example, if the client software 203 merely sends the server software 208 the state change (new data entry value) and the express command (enter key is hit) it is sufficient information for the server software 208 to start the special process even though the command never explicitly referred to the state change. As discussed ahead, the hierarchical order of the protocol mandates the server software 208 process the state change before the command which, by itself, preserves the relationship between the command and state change and allows for the command to not explicitly refer to the state change.

Again, this example may be implemented in an alternate fashion. Specifically, instead of sending the server software 208 a "hit enter key" command along with the data entry value state change, the client software 203 may alternately send a "start specific process" command. Thus it is functionally immaterial whether the command is embodied as an express offering at the user 211/GUI 205 interface (e.g., "hit enter key") or as an instruction (e.g., "start specific process") between the two software layers (i.e., client 203 or server 203). The specific approach may be chosen at the option of the software designer. Giving the client the ability to send command instructions to the server involves more code in the client software 203 which may be undesired in some applications. As such, some applications may provide for command instructions to be sent only in the direction from the server to the client.

Before moving on to protocol example, a brief discussion of the scope of its applicability is necessary. Specifically, the effective hierarchical exchange of definitions (if any), state changes (if any) and commands (if any) may be implemented in any environment where a single application depends upon the cooperative (i.e. co-dependant) operation of two devices remote from one another. In the client server environments discussed herein the client device 240 is remote from the server device 209 since both are separated by a network. Thus a remote device is a device communicatively coupled to the local device via a network.

Client/server environments may be characterized as remote environments where substantially more software code runs upon the server than upon client. It is therefore important to note that the present invention is applicable to other environments where no such code imbalance exists. That is, the present invention may be applied to any environment where an application is executed as a whole over remote devices and is not necessarily limited to those environments requiring a code imbalance or a specific degree of code imbalance as to the remote devices.

Figure 3:
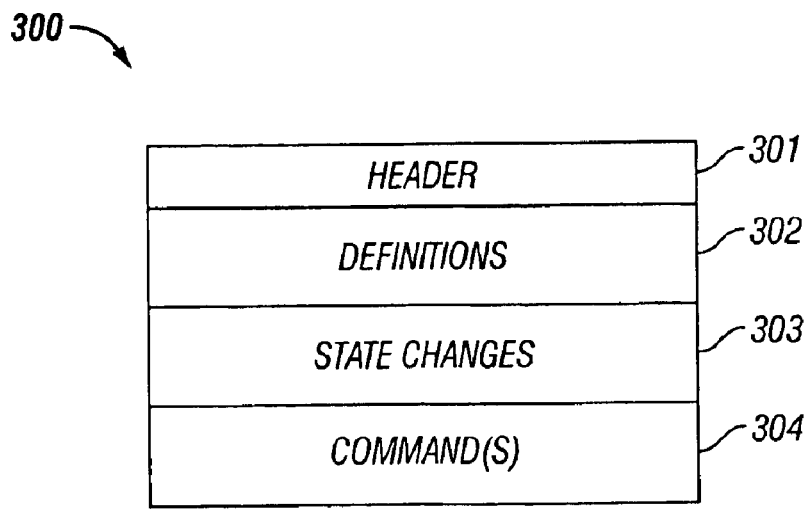
FIG. 3 shows a message hierarchy for the client/server architecture of FIG. 2.

FIG. 3 shows an embodiment of the message 300 containing the fundamental characteristics. A header 301 precedes a definition 302 which in turn precedes a state change 303 which in turn precedes a command 304. The message embodiment 300 is organized according to a hierarchy followed when processing the message. That is the header 301 should be processed before the definition 302; the definition 302 should be processed before the state change 303, the state change 303 should be processed before the command 304. Alternatively, each message 300 may contain lists of definitions within a definition space 302; and/or lists of state changes with a state change space 303; and/or lists of commands within a command space 304.

The header should be processed first in case data is corrupted over the network. Otherwise, corrupted definitions, state changes or commands may be processed before a request to resend the message is sent. Next, all definitions should be processed before any state changes. Definitions are sent when newly needed. Once a definition is received, it is "remembered" at the receiving device so that when the definition is thereafter utilized it does not need to be resent. Similar to the aforementioned relationship between a state change and a command, a state change does not require explicit reference to a definition.

State changes sent between server and client may be related to a definition in the sense that, for example, a data form having a defined (i.e., fixed) column may embrace changes in the data values (i.e., state changes) entered within that column. However, once again, no specific reference by the state change to the definition is required. The state change need only refer to the affected state (e.g., the record of modifiable data values within the form).

Nevertheless, definitions are processed before state changes in order to address these instances where a state change is related to a newly needed definition. For example, assume a newly needed definition incorporates a default state. In order for a state change to be implemented to the default state at the same instant the definition is used, the definition and its default state must be understood before the default state can be modified by the state change. For these and similar purposes, therefore, definitions are always processed before state changes.

For similar reasons state changes should be processed before commands. That is as discussed, commands may relate to one or more state changes. The state change(s) should be processed before the command is processed so that the significance of the command can be understood. Thus another aspect of the protocol is that state changes are processed before commands.

It is important to note that not every message will have a definition, state change and command. For example, in some embodiments the client software 203 may request a form from the server software 208. In response, the server software 208 sends a message having the definition of the new form. In this example, this message has neither a state change nor a command. The client software 203 simply processes the definition. Thus messages may contain various combinations of definitions, state changes and commands depending on the dynamics of the application's operation. This will become apparent in the example described with reference to FIGS. 5 and 6.

It is also important to note (as alluded to above) that more than one definition, more than one state change and more than one command may be sent per message. As long as all definitions are processed before all state changes and all state changes are processed before all commands (i.e., the hierarchy is preserved), the necessary relationships will be automatically preserved and understood. Thus any singular reference to a definition (e.g., "the definition" or "a definition"), a state change or a command should not be read as limiting the invention to embodiments not entertaining multiple definitions, state changes or commands per message.

The message 300 embodiment of FIG. 3 may be viewed more as a messaging hierarchy rather than a tangible message format. A message associated with an ordered or hierarchical protocol may also be referred to as an ordered message. The tangible ordered message formats sent over the network may follow the organization of FIG. 3. That is, bundle the header 301, Definitions 302, State Changes 303 and Commands 304 into a single message in the above order. Other embodiments may tag an error checking field at the end of the message. Further embodiments may mix the fundamental characteristics 301, 302, 303 in any order provided they are processed in the order described above.

Note that in embodiments bundling all the characteristics into one ordered message, empty definition fields are possible. That is, as discussed before, ordered messages may be sent indicating a state change (and command) but not having any definition information. In such a case, the definition field of the ordered message is empty since the related definition is already known by the receiving device. Still other ordered messaging embodiments may comprise only one or two characteristics per message. This is acceptable provided the hierarchy in processing just described is preserved.

Before moving on to a specific messaging example, some further points about the protocol may be helpful. First, the protocol may be viewed as three independent channels: a definition channel, a state change channel and a command channel. Since information within one channel does not require explicit reference to information associated with another channel, these channels may be described as independent. As long as the hierarchy is maintained per received message (definitions (if any) processed before state changes (if any) and state changes (if any) processed before commands (if any)), the receiving software (either client or server based) has the intelligence to recognize the significance of any relationships between these channels.

Second, the protocol may be used to maintain "synchronization" between the client and server. That is, further messages are not sent by a sending device until it receives some form of acknowledgement by the receiving device that it is has received a prior message and/or updated the GUI understanding at the receiving end accordingly. By delaying further message transmission until receiving confirmation of a previous transmission, the GUI understandings of the client and server are guaranteed to be effectively synchronous with one another at all times. Thus various embodiments may include some form of communication confirmation in order to maintain synchronization.

The necessary acknowledgement may be in the form of a response to an initial message. That is, since the messages relate to the co-dependence of the remote software (and particularly the dependence of the client software 203 on the server software 208), an initial message is frequently responded to by a responding message. For example, when the client software 203 needs the server 208 to get a form, the acknowledgement is realized when the server software 208 responds with the form.

Figure 4:
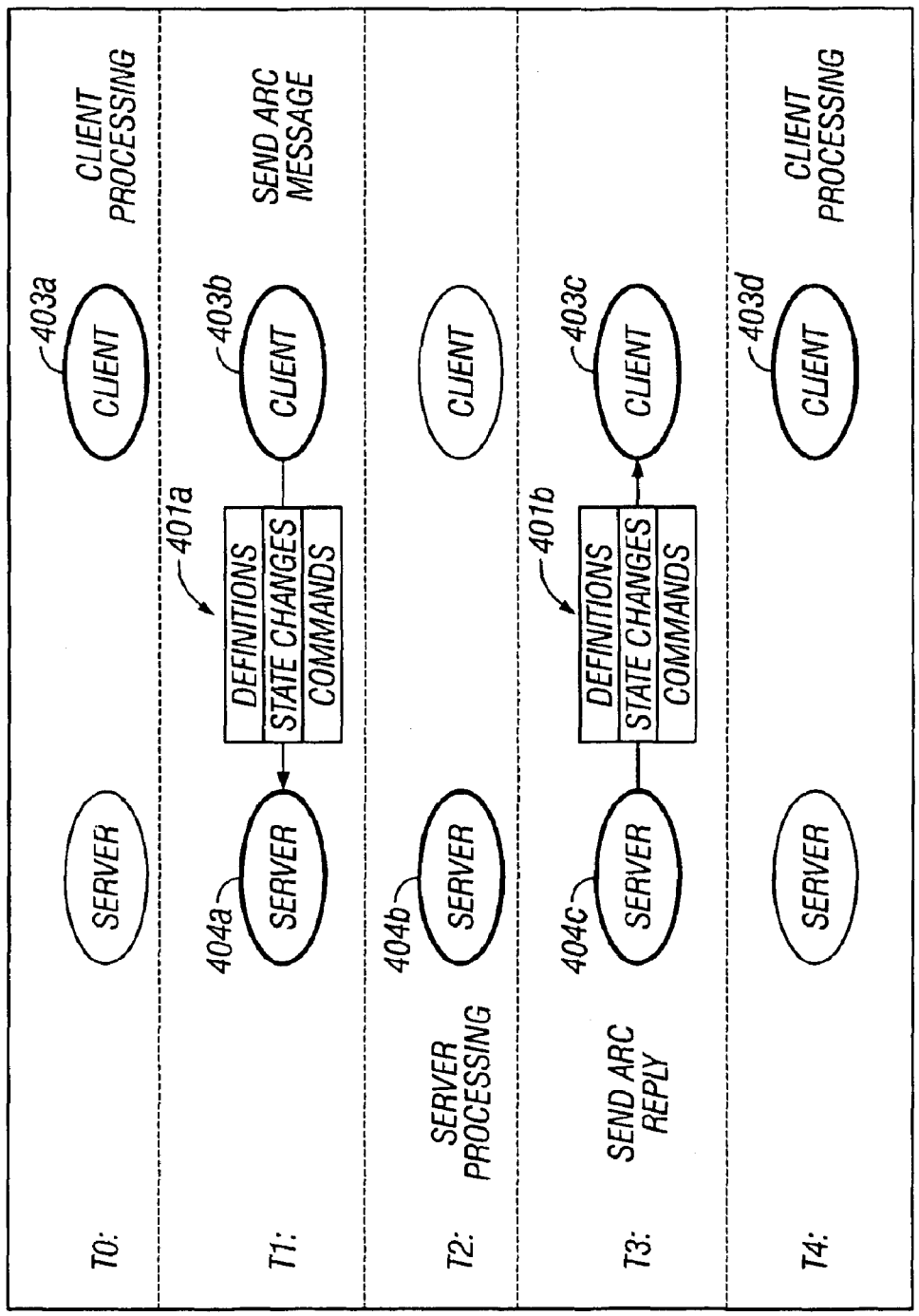
FIG. 4 shows an example of messaging between a client and server.

FIG. 4 shows an example of a messaging sequence where the ordered message 401a,b comprises all three fundamental characteristics 402a,b,c. At time T0, the client 403a processes, for example, some activity by the user. This involves updating the GUI understanding within the client 403a. After this update, at time T1, the client 403b sends an ordered message 401a to the server 404a. At time T2, the server 404b processes the ordered message which involves updating its GUI understanding and initiating and application processes that may result from the update. At time T3, the server 404c sends an ordered message 401b to the client 403c that reflects a new GUI state (resulting perhaps from an application process just performed on the server 404b). The client 403d, at time T3, processes this ordered message 401b which involves updating its GUI understanding and reflecting this update to the GUI itself.

Figure 5:
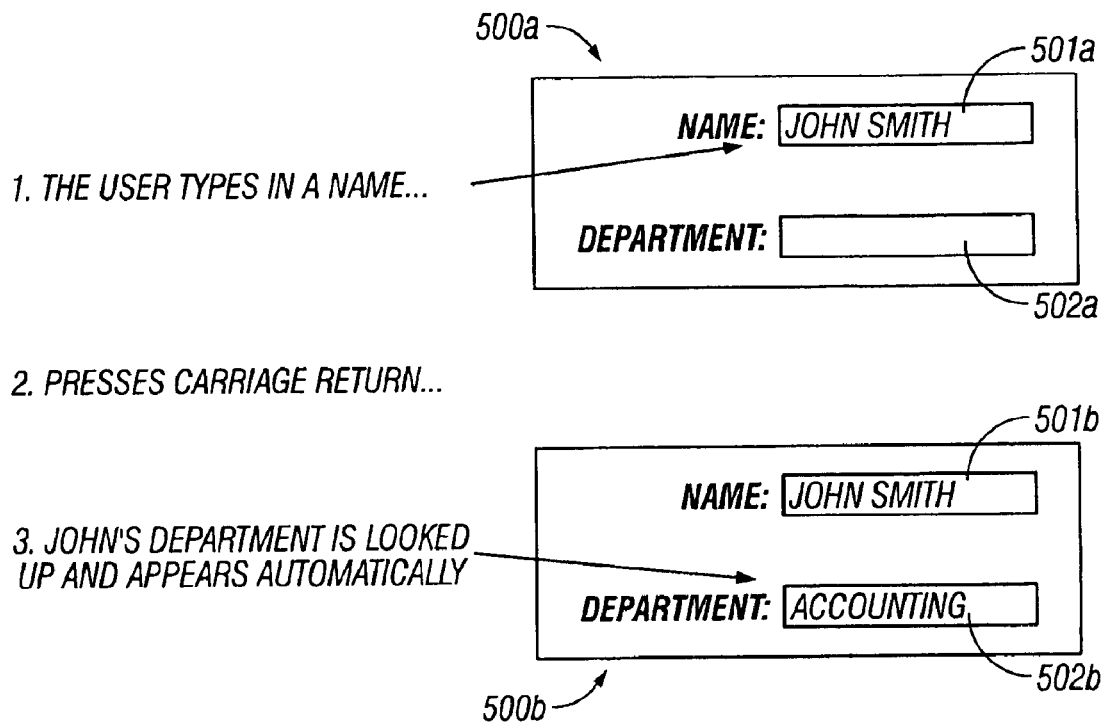
FIG. 5 shows an example of an application.

FIGS. 5 and 6 show another simple example. Assume a basic application 500a,b, as shown in FIG. 5, has been created. The application 500b displays an employee's department in the department field 502b when his/her name is typed in the name field 501a (as shown in application 500a). The application software on the server follows the following rule: whenever the return key on the name field is pressed, use the value of the name field to look up the associated department; if there is exactly one match, put this value into the department field.

Thus the application 500a,b in the GUI may be named "form" having its state matter specified by two fields: an editable name field 501a,b and a read only department field 502a,b. The states are defined by whatever appears in each of these fields 501, 502. Assume the initial default value is "blank". The only command recognized (besides the initiation of the application itself) is the hitting of the return key. FIG. 6 shows the processing sequence for this example. Assume an ordered messaging embodiment that comprises all three fundamental characteristics is used.

At time T0, the client initiates the application. The ordered message sent to the server therefore comprises empty definition and state change fields along with a "run application" command. At time T1, the server processes the ordered message. The command triggers the loading of the application on the server (perhaps from another remote server). The server initiates the application by sending an ordered message to the client comprising the definition of the "form" (since it is newly created) having the two empty default fields 501, 502 (and perhaps graphical layout information as well). No state changes or commands exist, so these sections of the ordered message from the server to the client are empty.

Through times T2–T4, the client processes the ordered message according to the hierarchy. That is, the definition is processed first (at time T2) which results in the form 500a of FIG. 5a being displayed on the client's GUI and the definition record added to the client's GUI understanding. No state changes or commands are processed. During time T5 the client idles until the user enters a name (e.g., "John Smith") in the name field 501 at time T6. As the name is typed into the name field, the name field associated with the form's state record is updated in the client's GUI understanding. This activity corresponds to a state change in the form. At time T7 the user hits the return key which is equivalent to a command after which (at time T8) the client sends an ordered message to the server comprising the state change and the return key command. At time T9, the server begins to process the ordered message which involves no new definition. The state change is then applied to the server's GUI understanding at time T10 via its corresponding form state record. When the return key is processed at time T11 it triggers the aformentioned business rule. The server finds the proper department (e.g., "accounting") and enters it into the department field of the corresponding form state record within the server's GUI understanding. At time T12 a message is sent to the client comprising only the state change. At times T13–T15, the client processes the ordered message which only involves entering "accounting" into the department field of the corresponding form state record within the client's GUI understanding. The client's GUI then reflects the form 500b of FIG. 5b.

It is important to note that the reduction of GUI interactivity, limited to application related interactivity in the above discussion, could be extended to operating system or other non-application related GUI interactivity. Thus, the fundamental characteristics may describe non-application interactivity as well.

Finally, FIGS. 7, 8 and 9 contain a list of commands, states and definitions for a programmable application that uses the protocol described herein. These are added in order to provide further insight into the different types of definitions, states and commands that may exist for an application that uses the protocol. These lists are not intended to be exclusive of other types of definitions, states or commands that may be used.

Thus a hierarchical protocol for a client/server environment has been described.

What is claimed is:

1. A method, comprising:
 a) receiving a message that was sent from a remote device, said message comprising a definition, a state change, and a command, said definition defining a fixed aspect of a user environment, said state change describing a change in a non-fixed aspect of said user environment, said command being a directive that causes a function to be performed; and,
 b) processing said definition before said state change and said command are processed, processing said state change before said command is processed, and processing said command.

2. The method of claim 1 wherein said command further comprises an express command.

3. The method of claim 2 wherein said express command corresponds to a clicking a mouse button.

4. The method of claim 2 wherein said express command corresponds to hitting an enter key.

5. The method of claim 2 wherein said express command corresponds to selecting an option from a menu.

6. The method of claim 1 wherein said command is an instruction command.

7. The method of claim 6 wherein said instruction command corresponds to getting a form.

8. The method of claim 1 wherein said state change corresponds to a new value in a form.

9. The method of claim 1 wherein said definition corresponds to the definition of a form.

10. The method of claim 1 wherein said processing said definition further comprises updating a definition record associated with a GUI understanding with said definition.

11. The method of claim 1 wherein said processing said state change further comprises updating a state record associated with a GUI understanding with said state change.

12. A method executed by a local device that cooperatively operates with a remote device in order to implement an application software program, said device separated from said remote device by a network, said method comprising:
   a) recognizing that a dependence on said remote device exists, said dependence being a need for said remote device to perform some act, said act allowing said application software program to continue to operate; and
   b) sending a message to said remote device, said message comprising a definition, a state change, and a command, said definition defining a fixed aspect of a said application software program, said state change describing a change in a non-fixed aspect of said application software program, said command being a directive that causes said remote device to perform said act.

13. The method of claim 12 wherein said command further comprises an express command.

14. The method of claim 13 wherein said express command corresponds to a clicking a mouse button.

15. The method of claim 13 wherein said express command corresponds to hitting an enter key.

16. The method of claim 13 wherein said express command corresponds to selecting an option from a menu.

17. The method of claim 12 wherein said command is an instruction command.

18. The method of claim 17 wherein said instruction command corresponds to getting a form.

19. The method of claim 12 wherein said state change corresponds to a new value in a form.

20. The method of claim 12 wherein said definition corresponds to the definition of a form.

21. The method of claim 12 further comprising updating a GUI understanding by processing said definition before processing said state change.

22. The method of claim 21 wherein said processing said definition further comprises updating a definition record associated with said GUI understanding with said definition.

23. The method of claim 21 wherein said processing said state change further comprises updating a state record associated with said GUI understanding with said state change.

24. The method of claim 12 further comprising translating said definition, said state change and said command to a GUI.

25. A device having a processor and a memory coupled to the processor, the memory having stored therein sequences of instructions which, when executed by the processor, cause the processor to perform the acts of:
   a) receiving a message that was sent from a remote device, said message comprising a definition, a state change, and a command, said definition defining a fixed aspect of a user environment, said state change describing a change in a non-fixed aspect of said user environment, said command being a directive that causes a function to be performed; and
   b) processing said definition before said state change and said command are processed, processing said state change before said command is processed, and processing said command.

26. The device of claim 25 wherein said command further comprises an express command.

27. The device of claim 26 wherein said express command corresponds to a clicking a mouse button.

28. The device of claim 26 wherein said express command corresponds to hitting an enter key.

29. The device of claim 26 wherein said express command corresponds to selecting an option from a menu.

30. The device of claim 25 wherein said command is an instruction command.

31. The device of claim 30 wherein said instruction command corresponds to getting a form.

32. The device of claim 25 wherein said state change corresponds to a new value in a form.

33. The device of claim 25 wherein said definition corresponds to the definition of a form.

34. The device of claim 25 wherein said processing said definition further comprises updating a definition record associated with a GUI understanding with said definition.

35. The device of claim 25 wherein said processing said state change further comprises updating a state record associated with a GUI understanding with said state change.

36. A local device that cooperatively operates with a remote device in order to implement an application software program, said device separated from said remote device by a network, said device having a processor and a memory coupled to the processor, the memory having stored therein sequences of instructions which, when executed by the processor, cause the processor to perform the acts of:
   a) recognizing that a dependence on said remote device exists, said dependence being a need for said remote device to perform some act, said act allowing said application software program to continue to operate; and
   b) sending a message to said remote device, said message comprising a definition, a state change, and a command, said definition defining a fixed aspect of a said application software program, said state change describing a change in a non-fixed aspect of said application software program, said command being a directive that causes said remote device to perform said act.

37. The local device of claim 36 wherein said command further comprises an express command.

38. The local device of claim 37 wherein said express command corresponds to a clicking a mouse button.

39. The local device of claim 37 wherein said express command corresponds to hitting an enter key.

40. The local device of claim 37 wherein said express command corresponds to selecting an option from a menu.

41. The local device of claim 36 wherein said command is an instruction command.

42. The local device of claim 41 wherein said instruction command corresponds to getting a form.

43. The local device of claim 36 wherein said state change corresponds to a new value in a form.

44. The local device of claim 36 wherein said definition corresponds to the definition of a form.

45. The local device of claim 36 further comprising updating a GUI understanding by processing said definition before processing said state change.

46. The local device of claim 45 wherein said processing said definition further comprises updating a definition record associated with said GUI understanding with said definition.

47. The local device of claim 35 wherein said processing said state change further comprises updating a state record associated with said GUI understanding with said state change.

48. The local device of claim 36 further comprising translating said definition, said state change and said command to a GUI.

49. A machine readable medium having stored thereon sequences of instructions, which when executed by a processor, cause the processor to perform a method, said method comprising:

a) receiving a message that was sent from a remote device, said message comprising a definition, a state change, and a command, said definition defining a fixed aspect of a user environment, said state change describing a change in a non-fixed aspect of said user environment, said command being a directive that causes a function to be performed; and b) processing said definition before said state change and said command are processed, processing said state change before said command is processed, and processing said command.

50. A machine readable medium to be executed by a local device that cooperatively operates with a remote device in order to implement an application software program, said device separated from said remote device by a network, said machine readable medium having stored thereon sequences of instructions, which when executed by a processor, cause the processor to perform the acts of:

a) recognizing that a dependence on said remote device exists, said dependence being a need for said remote device to perform some act, said act allowing said application software program to continue to operate; and b) sending a message to said remote device, said message comprising a definition, a state change, and a command, said definition defining a fixed aspect of a said application software program, said state change describing a change in a non-fixed aspect of said application software program, said command being a directive that causes said remote device to perform said act.

* * * * *